United States Patent

Yamamoto et al.

[15] 3,668,312

[45] June 6, 1972

[54] TELEVISION TELEPHONE SYSTEM

[72] Inventors: Kazuyuki Yamamoto, Tokorozawa; Ryoichi Matsuda, Tokyo, both of Japan

[73] Assignee: Nippon Telegraph & Telephone Public Corporation, Tokyo, Japan

[22] Filed: Apr. 2, 1970

[21] Appl. No.: 25,136

[30] Foreign Application Priority Data

Apr. 10, 1969 Japan ....................................44/27239

[52] U.S. Cl. ..............................................178/6.8, 340/324 A

[51] Int. Cl. ...........................................................H04n 7/00

[58] Field of Search.................178/6.5, 6.8; 340/324 A, 152, 340/154; 280/214, 217; 179/2 TV

[56] References Cited

UNITED STATES PATENTS

| | | | |
|---|---|---|---|
| 3,584,142 | 6/1971 | Schoeffler | 178/6.8 |
| 3,500,336 | 3/1970 | Cuccio | 340/324 A |
| 3,389,404 | 6/1968 | Koster | 340/324 A |
| 3,475,612 | 10/1969 | Stupar et al. | 280/217 CR |
| 3,189,889 | 6/1965 | Bridgett | 340/324 A |
| 3,292,489 | 12/1966 | Johnson et al. | 340/324 A |
| 3,516,062 | 6/1970 | Spraker | 340/152 |

*Primary Examiner*—Robert L. Griffin
*Assistant Examiner*—Barry Leibowitz
*Attorney*—Sughrue, Rothwell, Mion, Zinn & Macpeak

[57] ABSTRACT

A television-telephone system for information transmission in a subscriber-subscriber communication mode or subscriber-computer communication mode, wherein the information transmission is effected between an information receiving party and a transmitting party, which may be a computer. A position indicating signal can be sent back from the receiving party to the transmitting party by using a light-pen and a signal switching network. The position indicating signal is sent to the transmitting party to indicate a command of the receiving party by displaying the position indicating signal superposed on the transmitted picture, or this indication information may be further processed and utilized by the transmitting party to form a definite digital indication of the position information.

10 Claims, 7 Drawing Figures

INVENTORS
KAZUYUKI YAMAMOTO
RYOICHI MATSUDA
BY Sughrue, Rothwell, Mion, Zinn & Macpeak
ATTORNEYS

TELEVISION TELEPHONE SYSTEM

BACKGROUND OF THE INVENTION

1. Field of the Invention

The present invention relates to a televion-telephone system, and more particularly to such a system having means for sending back an indication signal from an information receiving party of a television telephone system to an information transmitting party of the system by using a light-pen which detects the light of the raster of the transmitted information picture so as to indicate a command of the receiving party to the information transmitting party. This system can be applied to existing television-telephone subscribers by a minor modification and it greatly improves the utility of the television telephone system for information exchanging.

2. Description of the Prior Art

It is known to transmit picture information by means of a television-telephone system in a subscriber-to-subscriber communication system or in a subscriber-to-computer communication system. Such systems, which will be in actual use in the near future, have been disclosed, for instance, in Bell Laboratories Record, Vol. 46, No. 6, June 1968, page 206 entitled "-Picture Phone Set Puts a Computer on Executive's Desks," or Bell Laboratories Record, Vol. 47, No. 5, May –June 1969, pages 137 –141, "Picture Phone," by Iriwin Daras. In one of the proposed system for the utilization of a television telephone system for providing communication between two parties, one of which is an information requesting party and the other one of which is an information supplying party, the information supplying party transmits picture information to the other party while monitoring his own picture, and the parties communicate with each other by means of verbal communication. In a more developed form of such a system, the information supplying party may be a centralized computer which sends out memorized and stored information by means of picture and voice signals to an information requesting party, and the information requesting party may also send back demand information to the information supplying party by means of selecting equipment, such as push button selecting means in the telephone set.

Such a type of communication may be applied to a television-telephone service, wherein a television-telephone subscriber can request information from a central information storage center, which may be an electronic computer. Applications of this type of service, which may be termed an information service, may be weather reports, the road weather, stock prices and so on. Among such services there is, a seat reservation service, for instance, for the reservation of a seat in a train, an airplane, theaters, etc. In such a case, the information supplying party supplied visual information showing the reserved condition of seats at a certain date or of a certain number of a train or a flight. Then a demand from the information requesting party is received by voice or a dial selecting signal so as to complete the reservation.

In such a prior art system, for the above type of service, the demand from the information requesting party is sent either by voice or by multifrequency audio tone signal produced by push buttons to the information supplying party. The television monitoring portion of a television-telephone set of the television-telephone receiving subscriber or party is used to display the received information from the information service or supplying party, and voice or the dial selecting signal is used transmit indication information back to the information supplying party. Such a system is not satisfactory, since it inevitably includes substantial disadvantages as listed below.

a. The camera equipment part of the information receiving party is not utilized.

b. In the television-telephone exchange equipment, there are provided high quality two wideband video transmission networks. Nevertheless, in the above type of service, one of the wideband transmission networks, i.e., the path from the receiving party to the transmitting party is not utilized. Therefore, it is uneconomical from the traffic view point.

c. If a selected indication signal is to be sent back from the information receiving party to an information center based on the recognition of the received picture and on the selection of an item in the received two-dimensional picture by means of a push button or the like, some additional information must also be supplied from the information center indicating by which button the selected indication signals are to be sent. Such additional information is supplied by means of a voice signal or as a visual signal in the same transmitted picture signal. However, the indication by voice takes a lot of time, and the indication by picture is limited by the size of the picture and also by the frequency bandwidth of the transmitting path.

d. Since the indication from the receiving party to the information supplying party is either by voice or dial signals, the indication is indefinite and insufficient to indicate detailed two-dimensional information. Therefore, communication of a decision may not smoothly be effected.

SUMMARY OF THE INVENTION

The present invention has for its object to realize a novel television-telephone system wherein during the communication of a television-telephone subscriber with an information supplying party, such as another subscriber or a computer, to request transmission of certain picture information from the supplying party, the information receiving party can send back to the supplying party a position indicating signal by pointing out a desired point on the received picture, and at the transmitting side of the supplying party the sent back signal is either utilized by visually displaying it as superposed on the transmitted picture or is utilized by further converting it into a position indicating digital information which may directly be processed as an input to the computer.

The present invention has for its further object to provide an indicating means which may easily be applied to existing television-telephone sets by making a quite minor modification of the equipment.

Another object of the present invention is to provide such a television system in which the picture information receiving television-telephone subscriber may send back definite position indicating information signal irrespective of the image brightness of the indicating point in the received television image, and moreover this position indicating information may definitely be detected at the transmitting side or information supplying party visually or may further be processed to detect the very accurate position indicating information.

The television-telephone system of the present invention is characterized in that a light-pen means is provided with the receiving television-telephone equipment, which light-pen means comprises hook or jack type normally off switches which operate by the removal of the light-pen from the normal position. The television-telephone equipment is so constructed that by the operation of these switches the local synchronizing signal oscillating circuit producing a synchronizing signal for its own transmitter is switched off, and a synchronizing signal is obtained by a separation process from the signal of the received picture information. By placing the light-pen at a position in the raster of the received picture, the light-pen is energized to produce a position indicating signal which is sent back to the transmitting party by superposing it on the separated synchronizing signal.

In a further aspect of the present invention, the thus produced position indicating signal sent back in superposition with the synchronizing signal is received at the transmitting side and is divided into the position indicating signal and the synchronizing signal. The synchronizing signal is further divided into a horizontal synchronizing signal and a vertical synchronizing signal which signals are used to open respective gate circuits so as to pass pulses produced from pulse oscillators each having oscillating frequencies corresponding to the desired accuracy of the detection of the identification of the point indicated by the receiving party. These oscillator pulses are passed to horizontal and vertical pulse counters, respectively, which operate to close these gate circuits so as to stop the counters and thus to convert the position indicating signal into definite digital horizontal and vertical signals representing the corresponding horizontal and vertical positions of the indicated point at the receiving end, and these digital signals are treated directly by the computer according to the need.

DESCRIPTION OF THE PREFERRED EMBODIMENTS

Figures 1, 2:
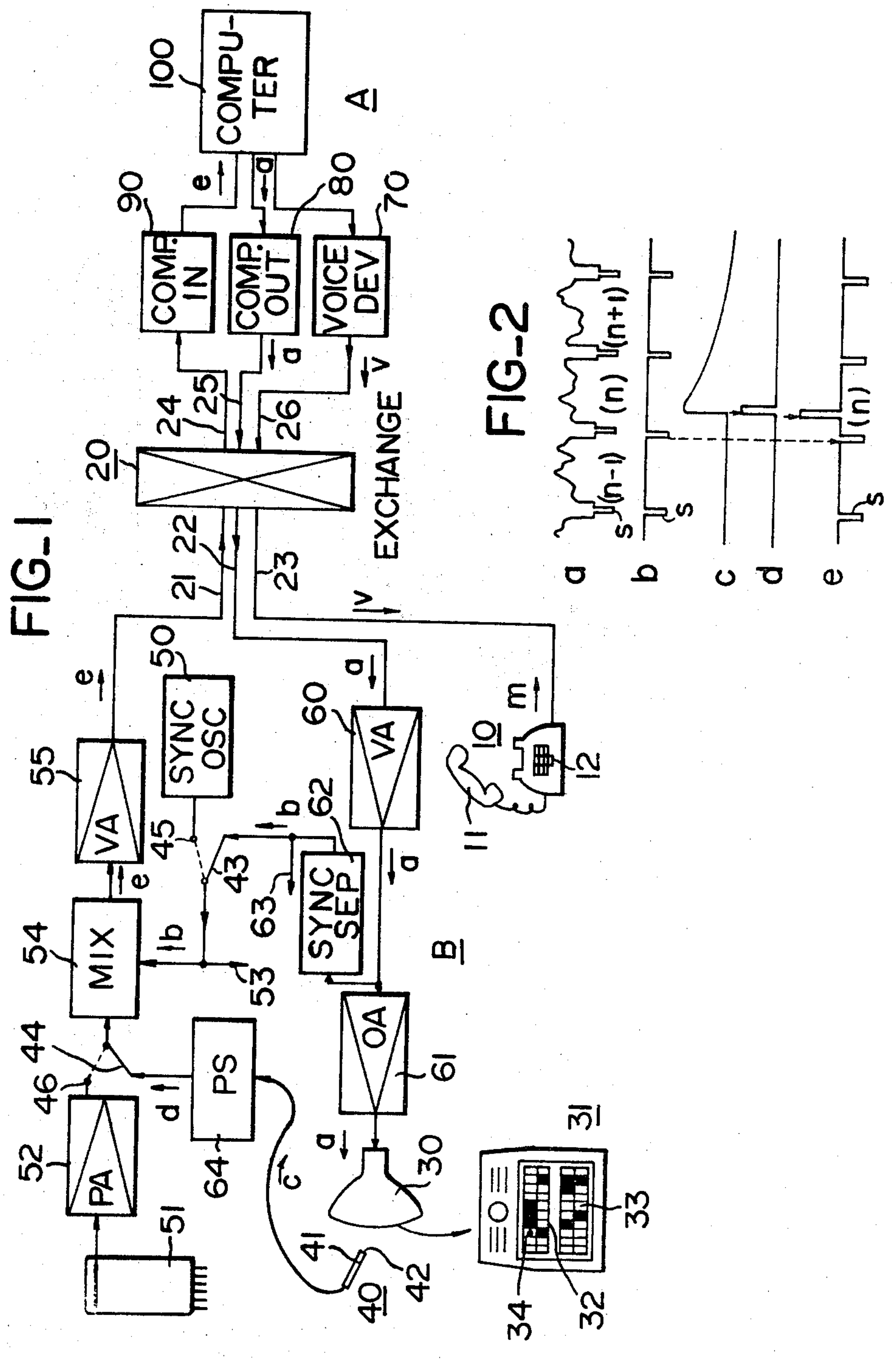
FIG. 1 is a detailed block diagram showing a subscriber apparatus of the television telephone system according to the present invention.
FIG. 2 shows signal wave forms at various parts of the embodiment shown in FIG. 1.

FIG. 1 is a block diagram showing a practical embodiment of the system of the present invention.

In FIG. 1, 10 is a telephone set of a television telephone subscriber B, 11 is a handset and 12 is a selecting signal sending equipment, for instance, shown in the form of a push button type. Since the telephone set per se is known, the detailed explanation of the same is not made in this specification, but it may suffice to note that the set is connected to a central exchange 20 via a telephone line 23 by taking off the handset 11 from the cradle of the telephone set. The subscriber B can effect the desired selection by sending out, for instance, multifrequency audio signal m by means of the selecting signal sending equipment 12, and he can make necessary communication by voice through the handset 11.

30 is a displaying cathode ray tube of the television telephone set and 31 refers generally to the display screen of the tube. In order to simplify the explanation of the present invention, only the necessary parts for the understanding of the invention are shown in the figures, but it should be understood that all the necessary parts for the function of the television set, such as various deflecting coils of the cathode ray tube or the electric sources, are provided in the equipment.

In accordance with the system of the present invention a light-pen 40 is additionally provided and comprises a photoelectric element 41, consisting of photo-diode, photo transistor or the like, and a contact switch 42, the details of which will more fully be described hereinafter. Adjacent to the set, for instance, in an appropriate portion near the cathode ray tube there is provided a cradle type or jack type switch for accommodating the light-pen 40 when the light-pen 40 is not in use. This switch is normally off and comprises movable contacts 43 and 44 which are mechanically ganged together. The normally off position of contacts 43 and 44 is shown by the dotted lines, and is the position of the contacts when the light-pen 40 is not in use. The on position of the contacts is shown by the full lines and is effected by taking off the light-pen from the switch. These contacts are mechanically operated to close the circuit shown by the full lines.

Each television telephone set houses a synchronizing signal oscillating circuit 50, by which an independent synchronizing signal is produced per each set and the signal is supplied to a synchronizing signal mixing circuit 54 via the fixed contact 45 and movable contact 43 which is in its normally off position when the light-pen is not in use. 53 is a wire for supplying the synchronizing signal to the deflecting circuit (not shown) of the camera equipment of the set and is branched from the conductor leading to the mixing circuit 54. 51 is a camera tube, for instance, a vidicon tube consisting of the camera portion of the television telephone set of the party B. This camera tube supplies an output to a preamplifier 52, which in turn supplies the output to the mixing circuit 54 via the fixed contact 46 and movable contact which is in its normally off position when the light-pen is not in use. The output of the mixing circuit 54 is further amplified in the video amplifier 55 and is sent out to the exchange 20 via transmitting line 21. The associated circuits of the camera tube 51 are known and not shown, since they have no particular importance for the understanding of the present invention.

If this subscriber B wishes to obtain a certain information service, he must make a necessary selection by dialing. Then this party B is connected by the exchange 20 to a transmitting party A, the details of which will be given later on, and a composite video signal a is transmitted via lines 25 and 22. This signal a is amplified by a video amplifier 60 and supplied to the displaying cathode ray tube 30 via an output amplifier 61. In FIG. 1, the display screen 31 of the cathode ray tube 30 is displaying an image of a picture of train seats indicated by 32 and 33.

The details of the transmitting side A will be described hereinafter, but briefly, 100 is, for instance, an on-line type electronic computer, which may be reached by a predetermined service code of the system and transmits requested information in response to additional selecting digits sent from the party B. 70 shows generally a voice transmitting device of the computer 100, 80 is generally an output device, and 90 is an input device of the computer. The details of these equipments will be described hereinafter. 24, 25 and 26 are the connecting circuits of these equipments in the exchange, wherein 24 and 25 are wideband circuits and 26 is a voice frequency circuit.

The operation of the system of the invention is as follows:

As mentioned above, if the television telephone subscriber B makes an information service call, his telephone set 10 is connected by the exchange 20 to the computer 100. Then a composite video signal a typically shown in FIG. *2a* is sent out from the output equipment 80 of the transmitting side via lines 25 and 22 to the video amplifier 60 and supplied to the cathode ray tube 30 via the output amplifier 61 and displayed as visual picture information. In FIG. *2a* s indicates a horizontal synchronizing signal. In this condition the light-pen 40 is in the normal or the housed position and the movable contacts 43 and 44 are in their normally off positions shown by the dotted lines. The output signal of the camera tube 51 is sent through the preamplifier 52, contacts 44 and 46 and circuits 54 and 55 to the line 21. The local synchronizing signal produced by the synchronizing signal oscillator 50 is fed on one hand to the camera deflecting circuit (not shown) and on the other hand to the synchronizing signal mixing circuit 54 and thereafter sent to line 21 via the video amplifier 55. A synchronizing signal separating circuit 62 is connected in branch from a circuit between the video amplifier 60 and the output amplifier 61. This circuit 62 separates the synchronizing signal s shown in FIG. *2b* from the received composite video signal a shown in FIG. *2a*. A part of the separated synchronizing signal *s* is fed to a monitor deflecting circuit (not shown) via wire 63.

If the party B wishes to send back a position indication signal in the received picture information according to the present invention, he first picks up the light-pen 40. By this action, the normally off contacts 43 and 44 are mechanically moved into the positions shown by the full lines and close the light-pen circuit. The top of the light-pen 40 is then pressed against the display screen receiving the video information. For instance, if it is pressed against point 34 in the screen, the switch 42 provided at the top of the light-pen 40 operates by the contact pressure, and the photoelectric element 41, consisting of photo diode, photo transistor, etc., is turned on.

By the operation of the movable contact 43 the synchronizing signal oscillating circuit 50 for the subscriber's own transmitting system is cut off, and the synchronizing signal *b* separated from the received composite image signal a sent from the transmitting party A by the synchronizing signal separating circuit 62 as shown in FIG. 2*b* is instead supplied to the synchronizing signal mixing circuit 54. Also by the operation of contact 44 the camera tube 51 and the preamplifier 52 are cut off from the transmitting circuit of the subscriber's set, and the light-pen 40 connected in series with a pulse shaping circuit 64 is connected to the synchronizing signal mixing circuit 54.

Figure 3:
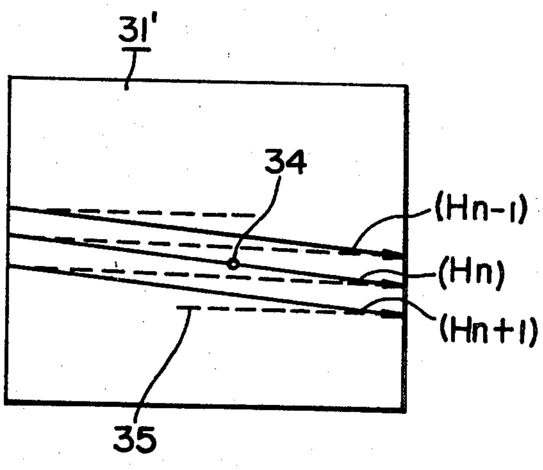
FIG. 3 is a schematic diagram illustrating the relation between the scanning lines of the raster of the transmitted picture and the position of the light-pen.

FIG. 3 is a diagram showing the relation between the indicating point 34 of the light-pen 40 and raster of the picture 31' of the cathode ray tube 30. While receiving picture information, the scanning is made from left to right of the picture 31' and from top to bottom thereof, and the cathode ray spot moves cyclically. At the same time a composite video signal a sent from the transmitting side A and shown in FIG. 2a is supplied to the control circuits of the cathode ray tube. Accordingly, the spot is moving on the screen while producing a variation of the brightness. In FIG. 3, $H_{n-1}$ is the $(n-1)$ th scanning line, and $H_n$ is the nth and $H_{n+1}$ the $(n+1)$ th scanning lines, respectively. 34 indicates the position of contact of the top of the light-pen 40 onto the surface of the cathode ray tube. By making the size of top of the light-pen slightly larger than the scanning interval, it must cross at least one of the scanning lines. The figure shows the nth scanning spots crossing the contact point or the indicating point 34. In case of interlacing scanning, the passing position of each spot in each successive field of an image frame is different, but by making the top size of the light-pen the size mentioned as above, each scanning interval of the spot is sufficiently covered by the top of the light-pen. If the nth scanning spot passes the indication point 34 of the light-pen 40, a damped pulse signal *c* as shown in FIG. 2*c* is produced at an output of the photoelectric element 41 of the light-pen 40. Since the element 41 consists of a photo transistor or photo diode, which may be made sufficiently highly sensitive, it is possible to make the light-pen sufficiently sensitive even at the lowest brightness of the raster of the picture. Therefore, even if the crossing point between the indicating point 34 and the nth spot $H_n$ is a black level of the signal, the element 41 produces an indication output. However, if required, the circuit of the contact switch 42 may additionally be made to include a circuit for varying the brightness of the raster of the cathode ray tube in the black level. The reason of forming an exponential damping of the pulse form shown in FIG. 2*c* is that the output decreases according to an after image character of the phosphorescence material of the cathode ray tube.

The output of the photoelectric element 41 of the light-pen 40 is supplied to the pulse shaping circuit 64 and, after applying necessary amplification and wave form shaping therein, a pulse *d* having a constant level as shown in FIG. 2d is produced, and the pulse d is supplied to the synchronizing signal mixing circuit 54 via the movable contact 44. In the output of the synchronizing signal mixing circuit 54, a superposed signal of the separated synchronizing signal *b* derived from the composite video signal a transmitted from the transmitting party A and the pulse *d* constituting an indication signal is produced in the form of a composite indicating signal e shown in FIG. 2*e*. In this composite signal e the indication pulse signal d is superposed in the *n*th horizontal scanning period, and this signal *e* is used as the position indicating composite signal. This composite signal *e* is applied the necessary amplification by the video amplifier 55 and sent back to the exchange 20 via line 21. Then the signal *e* is supplied via line 24 and input circuit 90 to the computer 100 and treated as an indication information. The operation in the central equipment will be described more fully later on. During these period, necessary voice information *v* is sent from the computer by means of the voice responsive device 70 to the telephone set 10.

Figure 4:
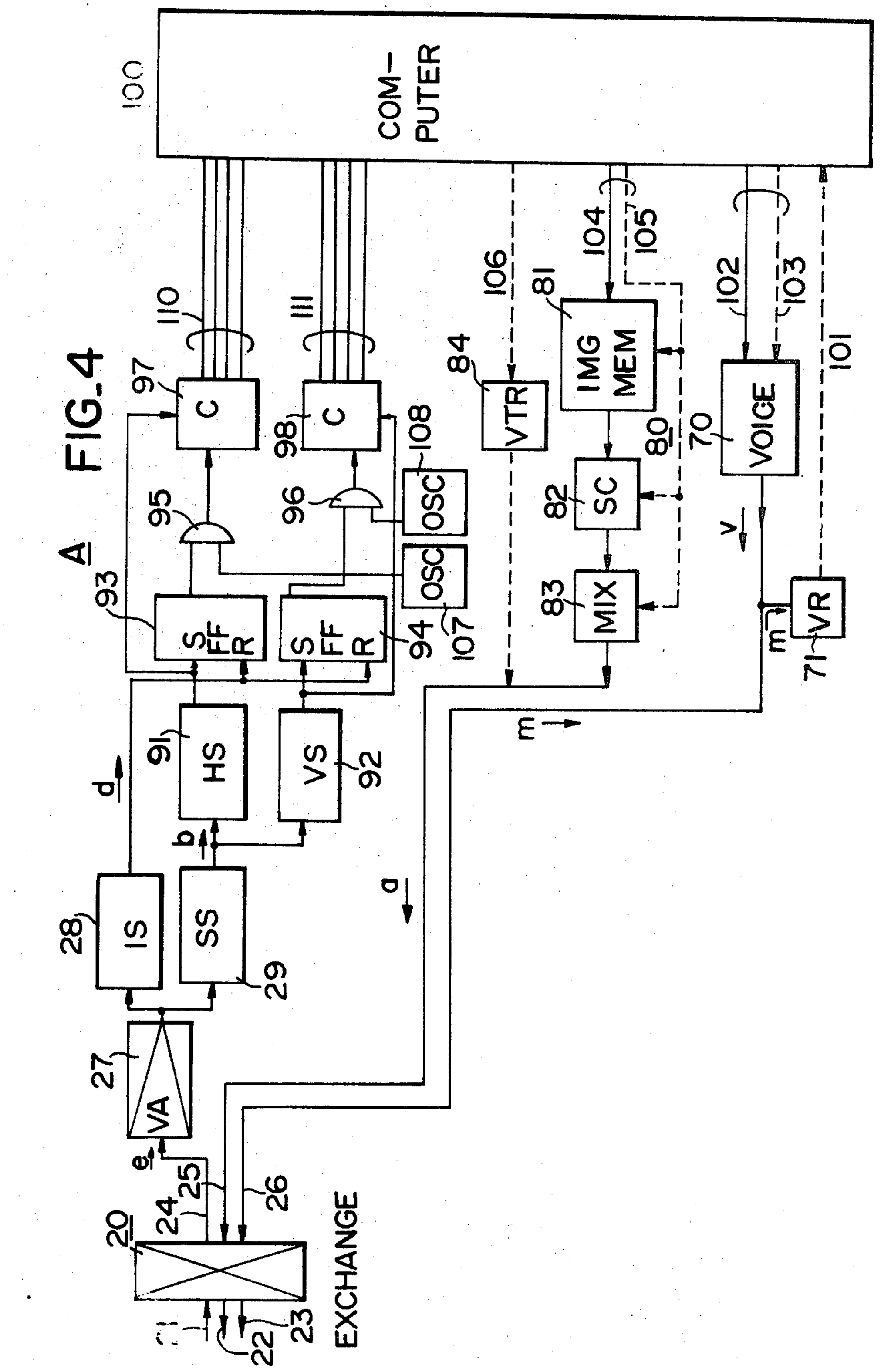
FIG. 4 is a simplified block diagram showing an embodiment of the coupling device of a central computer according to the present invention.

FIG. 4 is a block diagram showing principle of operation of an information center A of a television telephone system according to the present invention. There are various types of such information centers, and accordingly, the figure illustrates only one possible embodiment, and the present invention is not limited to this embodiment.

In FIG. 4, 20 is the telephone exchange. 21 to 26 are the lines terminating at the exchange and are also shown in FIG. 1 by the same reference numerals. As mentioned before, 21, 22, 24 and 25 are the video circuits, and 23 and 26 are the voice or audio circuits. If this television telephone information center A is connected from a subscriber B, such as shown in FIG. 1, at first a selecting information code m, for instance, consisting of a multifrequency coded audio signal is received via line 23, exchange 20 and line 26, by an audio signal receiver 71. Then this signal is fed to the computer 100 via line 101, thereby transmitting the required selecting information to the computer.

The computer 100 responds to the received selecting information, and if a pattern or a picture is to be sent according to a predetermined program, it sends out an instruction to a video signal producing device 80, mainly consisting of a video memory device 81, via data controlling lines 104 and 105. In this respect, the computer 100 sends out data containing the information content and the associated controlling signal to the video memory device 81, which comprises, for instance, magnetostriction type delay lines, so as to store the content of the picture in the memory device. The memorized information content is converted into a video image signal by a converting circuit 82. Then this image signal is added with a synchronizing signal in a synchronizing signal mixing circuit 83 to form a composite video signal *a*, such as shown in FIG. 2*a*, and this composite video signal *a* is sent out to the line 25. If a moving picture or an image varying with the progress of time is to be supplied to the information requesting subscriber, the computer sends out a controlling signal to a video tape recorder 84 via a command line 106 to send out a prerecorded composite image signal. It is also possible to connect a character memorizing device (not shown), in addition to the video memorizing device, to the output of the computer, so that desired character patterns are read out by an indicating output of the computer to form an independent video information signal or to superpose on the desired video information.

The previously mentioned position indicating composite signal e sent back from the television telephone subscriber B is supplied via line 21, exchange 20, and line 24 to a video amplifier 27. This signal *e* is amplified in the amplifier 27 and supplied to a video signal separating circuit 28 and to a synchronizing signal separating circuit 29, respectively. By the above circuits 28 and 29 the signal e is separated into a video signal, namely, a position indicating pulse *d* shown in FIG. 2*d* and synchronizing pulses *b* shown in FIG. 2*b*. The synchronizing pulses *b* are further separated into horizontal and vertical synchronizing signals by a horizontal synchronizing signal separating circuit 91 and a vertical synchronizing signal separating circuit 92. These signals are supplied to the corresponding set-input terminals S of flip-flop circuits 93 and 94, respectively. The position indicating information signal *d* separated in the video signal separating circuit 28 is supplied to both of the reset terminals R of the flip-flop circuits 93 and 94. The outputs of the flip-flop circuits 93 and 94 are supplied to one of the input terminals of AND gate circuits 95 and 96, respectively. The other input terminals of these AND gate circuits are supplied with output pulses from pulse signal generators 107 and 108, respectively. These generators 107 and 108 produce pulses having repetition frequencies determined by a requirement for the discrimination accuracy of the horizontal and vertical positions of the indicating point in the display picture. The pulse generator 108 producing vertical position discriminating pulses may obviously be replaced by a pulse source derived from the source producing the horizontal synchronizing pulses. The outputs of the AND gates 95 and 96 are supplied to the inputs pulse counter circuits 97 and 98, respectively, whose clearing signal input terminals are supplied with the horizontal and vertical synchronizing signals, respectively. Each of the flip-flop circuits 93 and 94 is set by the horizontal or the vertical synchronizing signal, and is reset by the arrival of the position indicating information signal *d*. In this manner, by the number or count of pulses in the pulse counters at the time when the flip-flop circuits are reset by the position indicating signal *d*, horizontal position information and a vertical position information corresponding to the point indicated by the light-pen in the received picture of the party B are derived. This position information is derived from the horizontal position indication lines 110 and the vertical position indicating lines 111. For instance, in the example shown in FIG. 3, the information showing the horizontal position of the indicating point of the light-pen 40 of the subscriber B on the *n*th scanning line $H_n$ is obtained at the counter output lines 110. The horizontal position counter 97 counts continuously in each of the horizontal scanning periods, however, it is constructed to send out the horizontal position information to the computer 100 only when the flip-flop 93 is reset by the arrival of the position indicating pulse *d*, and the counter 97 is stopped accordingly. Through this input device the computer 100 can receive information concerning the indicated position as a continuous digital code having the required accuracy. Accordingly, the computer 100 can now respond with the information corresponding to the indicated position, and according to the need it may respond to a further command or selecting signal *m* received by the receiver 71 and make the necessary operation according to a predetermined program.

Figures 5, 6:
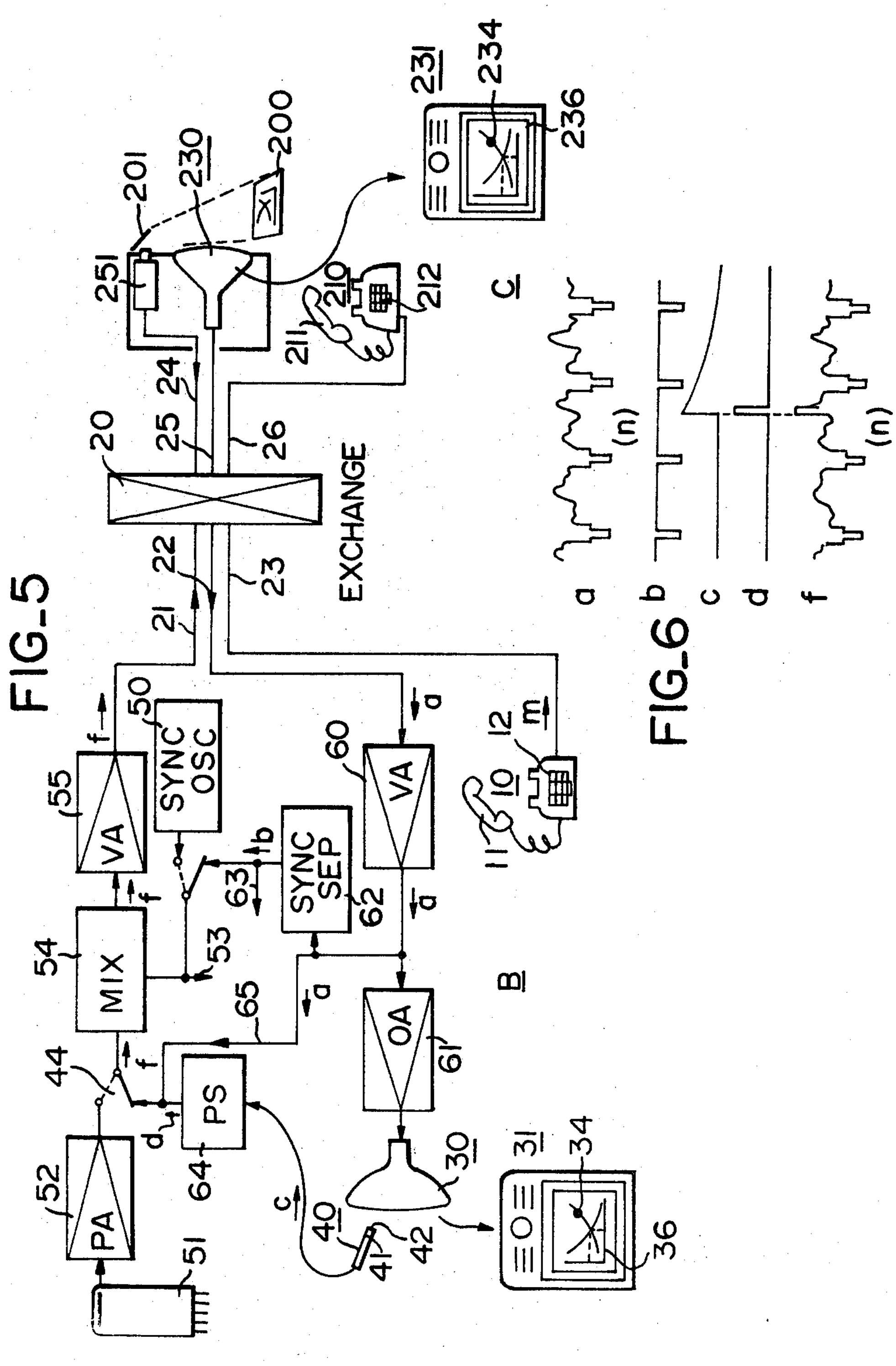
FIG. 5 is a block diagram showing the subscriber apparatus of a modified embodiment of the present invention.
FIG. 6 shows wave forms illustrating the operation of the device shown in FIG. 5.

FIG. 5 is a block diagram showing a modified embodiment of the present invention. This figure shows a possible embodiment wherein a television telephone subscriber B communicates with another television telephone subscriber C, while the subscriber C is sending video information concerning a table or a picture 200, that is the both parties B and C communicate each other observing an identical picture. In this figure, the parts corresponding with those of FIG. 1 are shown by the same reference numerals.

The equipment of the subscriber B is nearly the same as that shown in FIG. 1. The only difference is that the received video signal *a*, sent from the other party C, at the output of video amplifier 60 is further supplied by a connection wire 65 to the output of the pulse shaping circuit 64. The received image signal a is superposed on the output of the photoelectric element 41 of the light-pen 40, and synchronizing signals are added at the synchronizing signal mixing circuit 54 for the sake of completeness to produce a composite signal shown in FIG. 6*f*, which is a superposed signal of the video signal having the synchronizing signal and the position indicating signal *d*. This composite signal f is sent back to the transmitting subscriber C via line 21.

In the equipment of the transmitting subscriber C, 210 is a television telephone set, 212 is the dialing equipment, 211 is a handset and 230 is a monitoring cathode ray tube. The original picture 200 to be sent is reflected by a mirror 201 and optically projected onto a camera tube 251. This picture information is processed in the camera tube 251 and associated circuits and is converted into a picture information signal *a*, such as shown in FIG. 6*a*, and sent to the subscriber B. In the figure those parts not important for the understanding of the present invention are not shown.

As in the embodiment shown in FIG. 1, if the information receiving subscriber B wants to send a visual position indicating information to the other subscriber C, the light-pen 40 is used to indicate a point 34 on the raster of the cathode ray tube 30, such as illustrated in FIG. 3. The *n*th scanning line will come to cross with the light-pen 40 and a damped pulse *c*, such as shown in FIG. 6*c* is produced at the output. This pulse is treated by the wave form shaping circuit 64 to form a pulse *d* shown in FIG. 6*d*, and this pulse is superposed on the picture video information signal *a*, and a signal *f* having the wave form shown in FIG. 6*f* is produced. This signal *f* is sent back to the transmitting subscriber C via line 21, exchange 20 and the other circuits. This signal *f* is displayed on the screen 231 of the cathode ray tube 230 of the subscriber C and produces an identical image 236 which is exactly same with that of the image 36 except that a white dot is indicated on the point 234 corresponding to the indicating point 34 of the light-pen 40 on the picture screen 31 of the receiving set. In this case the subscriber C can supervise the transmitted imate picture in a loop manner through the circuit of the set of the receiving subscriber B. Therefore, a perfect supervision and confirmation is possible over the whole transmission path, and it is very convenient for a very important information transmission.

As shown in FIG. 6*f*, the indication of the light-pen at the receiving party may be effected in a white image area of the picture having a very high brightness. This is convenient in obtaining the output of the photoelectric element of the light-pen, but this is inconvenient to the discrimination or identification of the indicated point by the subscriber C. If necessary, the output pulse from the pulse shaping circuit 64 is further treated, for instance, by an astable type multivibrator which detects the wave height of the produced pulse *c* to alternately reverse the polarity of the pulse to a full white level and black level. Then the subscriber C can observe an alternately switching black and white spot, so that the identification of the position indicating signal is easily effected irrespective of the brightness of the background picture.

The present system shown in FIG. 5 is particularly convenient to permit a discussion among several subscribers by using the same picture or diagram in a conference conversation mode.

By applying the system of the present invention explained in the foregoing embodiments, various kinds of information services, such as train information service, including train seat information and train seat reservation services, weather service and etc., may quite easily be effected.

As an example of the utility of the system of the present invention, a practical embodiment of the seat reservation service will be explained hereinbelow.

Figure 7:
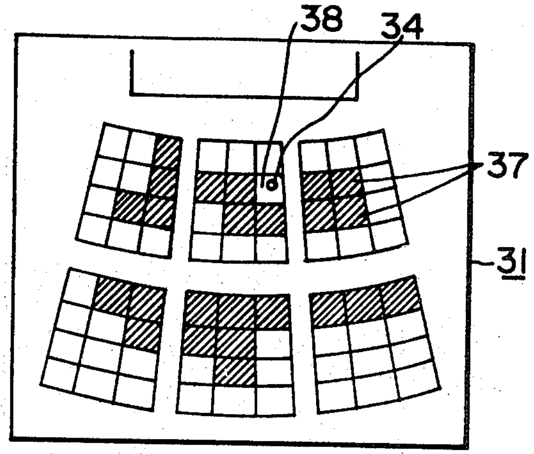
FIG. 7 is a diagram illustrating a practical application of the system of the present invention.

FIG. 7 shows an embodiment of a picture image used in case of a seat reservation service. The seat to be reserved may be any kind such as a ship, airplane, train, theater, etc. Assuming that a television telephone subscriber made an information call in order to confirm the situation of the reservation of the seats of a concert on a particular occasion, a picture image 31 shown in FIG. 7 may be received. In this figure the hatched or black sheets 37 are the reserved seats. By watching this picture the condition of the reservation may instantaneously be observed by the subscriber. By a voice announcement, prices of the available seat may be transmitted to the subscribers, then voice announcement, such as "please indicate by your light-pen the seat which you want to reverse," is transmitted, or this announcement may be visually displayed on a part of the displayed picture. If the subscriber wants to have reservation at the seat indicated by 38, he needs just to indicate the corresponding position 34 by his light-pen 40. Then the position indicating signal as explained above and containing the position information in the picture and having a wave form, such as shown in FIG. 2*e*, is sent out from the subscriber's set in a manner described already. The electronic computer 100 located at the exchange or information center receives and processes said signal *e*, and the position indicating information is identified. This information is memorized by the memory device to the effect that the seat 38 had been reserved. The computer may also send a controlling signal to the memory device and the image signal producing device used to produce the image pattern shown in FIG. 7, whereby the controlling signal converts the seat 38 which was indicated by the light-pen into a black image showing the reserved situation. Under this control the information requesting subscriber can observe the conversion of the seat 38 into black level, and he can confirm visually his reservation. He may also receive a voice announcement, such as "your seat reservation has duly been completed" and the call may be terminated.

If the above process is made without means of the light-pen according to the present invention, the necessary demand information concerning the reservation must be sent to the central equipment by the use of push button devices. In this case, first the central equipment must send to the requesting subscriber an indication by voice or image specifying which button is to be depressed in order to obtain a reservation of a particular seat. The voice announcement is inconvenient since the subscriber must pay close attention, otherwise be may miss the announcement. The visual indication for the proper push button is also inconvenient, since the picture is limited in size and the subscriber must press the button while he is looking at the push button surface and not at the picture. According to the system of the present invention such inconveniences may easily be solved and the reservation is very conveniently effected. Moreover, the confirmation of the completion of the same is also possible.

For a better understanding of the present invention, a practical operation of a train seat reservation will be explained. At first the subscriber obtains an access to an information service center containing train reservation information in a television telephone system according to the present invention. The subscriber sends the necessary information to the central computer by the position of the light-pen, and he may give successive position indications on pictures successively showing necessary information data, such as date of the departure, departing station, arriving station, name of the train, desired class, number of train; finally he may obtain a picture showing the seat reservation condition of a particular train such as shown by 31 in FIG. 1. Accordingly, by positioning his light-pen at a desired point 34 corresponding to a desired seat, the position indicating information is sent back to the computer, and the subscriber may confirm the reservation by information further supplied from the computer.

According to the present invention a very speedy and accurate communication information between a subscriber and an information center is possible, so that lengthy holding of very expensive television telephone networks may be avoided, and also the holding time of the centralized computer may be minimized. Accordingly, a great practical advantage may be obtained.

Further advantages of the present invention are listed below.

i. By using a light-pen at the receiving side the image transmitting portion of the receiving television telephone set is utilized efficiently.

ii. The utilization efficiency of the transmission path is highly improved since the very expensive wideband circuit provided at the exchange of the system is fully utilized.

iii. The subscriber can indicate very easily a narrow position in a two-dimensional picture by his light-pen. This is much easier for the subscriber as compared with the prior art case he must select the point by pushing buttons while listening to the necessary indication of which button is to be depressed. He need not remove his eyesight from the picture in order to press the push buttons and a very smooth information interchange is effected.

iv. By using the light-pen system of the present invention, a discussion between parties while observing the same picture or a diagram is easily accomplished. In this case, the transmitting party can indicate the desired indication by directly pointing on his picture, and the receiving party can make an indication by placing the light-pen onto the picture sent from the transmitting party. The transmitting party can observe a white spot or the moving line on his monitoring picture, so that a definite indication and convenient intercommunication may be effected. If such communication were effected only by way of one way picture transmission and verbal communication, quite a lot of time may be required.

v. By introducing the system of the present invention, a television-telephone set may be used as a displaying medium associated with a light-pen indicating means suitable for use in conjunction with an on-line system real time computer. By this system, efficient utilization of a computer becomes possible from an office or from a home, and thus a material improvement in the utilization of the capabilities of a television telephone system may be obtained.

As mentioned above, according to the introduction of the light-pen of the present invention for a television telephone system, the television telephone may be used not only for face-to-face or man-to-man communication for ordinary picture transmission but also for man-to-machine communication and for improved man-to-man information communication. These features are not available by the conventional communication systems.

Accordingly, the present invention provides a means for making unlimited use of highly modernized information communication.

What is claimed is:

1. In a television-telephone communication system including a plurality of telephone-television sets each including a television transmitting circuit and a television receiver, said television receiver including first display means for displaying an image corresponding to a received raster-scanned television signal which is transmitted by a television signal transmitting means coupled to said system, said television signal including an image signal and synchronizing pulses, the improvement comprising:

a. light pen means at a first television-telephone set and adapted to be positioned at a desired point of the displayed image to detect the light of the raster of the received television signal and to produce a position indicating signal identifying the position of said desired point;

b. signal separation means at said first television-telephone set for separating said received synchronizing pulses from said receive television signal; and c. signal mixing means connected to the transmitting circuit of said first television-telephone set for mixing together said position indicating signal and the separated synchronizing pulses to form a composite indicating signal, whereby said transmitting circuit transmits said composite indicating signal to said transmitting means to indicate thereat said desired point on the displayed image.

2. A television-telephone communication system as defined in claim 1 wherein said light-pen means comprises:

a. a photoelectric element responsive to the light from said displayed image, and b. switch means at one end thereof adapted to be mechanically operated when pressed against the surface of said display means to activate said photoelectric element to permit the production of said position indicating signal.

3. A television-telephone system as defined in claim 1 further comprising:

a. means at said first television-telephone set for coupling the received image signal to said mixing means to produce a modified composite indicating signal including said image signal, and b. second display means at said transmitting means for receiving said modified composite indicating signal and for displaying both the image corresponding to said image signal and a spot corresponding to said position indicating signal, the location of the displayed spot corresponding to the position of said light-pen means at said desired point of the displayed image on said first display means.

4. A television-telephone system as defined in claim 1 wherein said transmitting means comprises a computer which further comprises means for receiving and processing said composite indicating signal to identify the location of said desired point of said image.

5. A television-telephone system as defined in claim 4 further comprising:

a. means at each television-telephone set for generating a selecting signal corresponding to a desired image, and b. means for transmitting said selecting signal to said computer, said computer being programmed to respond to said selecting signal to transmit a television signal containing the image identified by said selecting signal.

6. A television-telephone system as defined in claim 5 further comprising:

a. means at said transmitting means for separating said synchronizing pulses from said composite indicating signal and for dividing said synchronizing pulses into horizontal and vertical synchronizing pulses, b. individual digital counting means for counting the number of vertical and horizontal synchronizing pulses between the beginning of each television scanning cycle and the occurrence of said position indicating signal, said digital counting means producing digital signals representing the counts of said horizontal and vertical synchronizing pulses, and c. means for transmitting said digital signals to said computer as an indication of the position of said light-pen means.

7. A television-telephone system as defined in claim 1 wherein said transmitting means is another one of said television-telephone sets.

8. A television-telephone system as defined in claim 1 wherein the transmitting circuit of each television-telephone set includes a television camera and a local oscillator producing transmitting synchronizing pulses, and further comprising switch means selectively responsive to the non-use and use positions of said light-pen means to operate said switch means to first and second positions, respectively; the first position of said switch means connecting said television camera and said local oscillator to said transmitting circuit and disconnecting said light-pen means and said signal separating means from said transmitting circuit; and the second position of said switch means disconnecting said television camera and said local oscillator from said transmitting circuit and connecting said light-pen means and said signal separating means to said transmitting circuit.

9. In a method of communicating between a plurality of television transceivers and a transmitting means which transmits a raster-scanned television signal including an image signal and synchronizing pulses, the improvement comprising:

a. receiving at a first transceiver the television signal and displaying the image signal;

b. placing a light pen at a desired point of the displayed image;

c. detecting with the light pen the light of the raster of the displayed image and producing a position indicating signal identifying the desired point;

d. separating the synchronizing pulses from the television signal received at said first transceiver;

e. combining the position indicating signal with the separated synchronizing pulses to form a composite indicating signal; and f. transmitting the composite indicating signal to said transmitting means to indicate thereat said desired point on the displayed image.

10. The improved method as defined in claim 9 further comprising:

a. combining said image signal with said composite indicating signal to produce a modified composite indicating signal;

b. receiving said modified composite indicating signal at said transmitting means; and c. displaying at said transmitting means both the image corresponding to said image signal and also a spot corresponding to said desired point of the image displayed at said first transceiver.

* * * * *